US009767945B2

(12) United States Patent
Tanaka et al.

(10) Patent No.: US 9,767,945 B2

(45) Date of Patent: Sep. 19, 2017

(54) MAGNET POWDER, BOND MAGNET AND MOTOR

(71) Applicant: TDK CORPORATION, Tokyo (JP)

(72) Inventors: Daisuke Tanaka, Tokyo (JP); Yasushi Enokido, Tokyo (JP)

(73) Assignee: TDK CORPORATION, Tokyo (JP)

(*) Notice: Subject to any disclaimer, the term of this patent is extended or adjusted under 35 U.S.C. 154(b) by 368 days.

(21) Appl. No.: 14/678,284

(22) Filed: Apr. 3, 2015

(65) Prior Publication Data

US 2015/0294773 A1 Oct. 15, 2015

(30) Foreign Application Priority Data

Apr. 15, 2014 (JP) ................................ 2014-083305

(51) Int. Cl.

*H02K 15/12* (2006.01)
*H01F 1/057* (2006.01)

(52) U.S. Cl.

CPC .................................. *H01F 1/0578* (2013.01)

(58) Field of Classification Search

CPC ......... H02K 1/02; H01F 1/0578; H01F 1/015; H01F 1/053; B22F 1/025; B22F 1/02
USPC ........ 310/43–44; 420/83; 148/301–306, 104; 355/302; 419/29
See application file for complete search history.

(56) References Cited

U.S. PATENT DOCUMENTS 4,063,971 A * 12/1977 Greinacher ............. B22F 1/025 148/103
4,115,159 A * 9/1978 Greinacher ............... B22F 1/02 148/105
4,888,506 A * 12/1989 Umehara ................ H01F 7/021 310/13
4,888,512 A * 12/1989 Shimizu ................ H01F 1/0577 148/104
2004/0244876 A1 12/2004 Konishi et al.
2007/0114856 A1* 5/2007 Park ....................... H02K 1/146 310/44
2008/0054736 A1* 3/2008 Miyata ..................... H02K 1/02 310/44

FOREIGN PATENT DOCUMENTS

| | | | |
|---|---|---|---|
| CN | 102903472 | A | 1/2013 |
| CN | 103559971 | A | 2/2014 |
| JP | S60-9852 | A | 1/1985 |
| JP | 4276541 | B | 6/2009 |

OTHER PUBLICATIONS

US 4,756,775, 07/1988, Croat (withdrawn)

* cited by examiner

*Primary Examiner* — Thanh Lam
(74) *Attorney, Agent, or Firm* — Oliff PLC

(57) ABSTRACT

A magnet powder having a composition composed of R (R consists of R1 and R2, R1 represents at least one rare earth element selected from the group consisting of Y, La, Ce, Pr, Nd, Sm, Eu, Tb, Dy, Er, Tm, Yb and Lu, R2 represents at least one rare earth element selected from the group consisting of Ho and Gd). T (T represents at least one transition metal element containing Fe or the combination of Fe and Co as essential element(s)) and B, wherein, the atomic ratio of R2/(R1×R2) is 0.05 to 0.1, the ratio of R/T is 0.25 to 0.35, and the magnet powder has an average primary particle size of 45 to 100 nm. The present invention also provides a bond magnet using the magnet powder.

3 Claims, No Drawings

MAGNET POWDER, BOND MAGNET AND MOTOR

The present invention relates to a magnet powder, a bond magnet using the magnet powder and a motor using the bond magnet.

BACKGROUND

The bond magnet is a permanent magnet obtained by mixing a magnet powder and a resin and then solidifying and molding the resultant mixture via an extrusion molding process, a compression molding process or an injection molding process. Although its performance is worse than that of the sintered magnet, it can be applied to electronic devices such as a motor or various sensors or the like thanks to the great freedom in shape and the good dimensional precision. Especially, the rare earth based bond magnet which has effectively taken advantage of excellent magnetic properties of the rare earth based alloys has been attracting attentions recently. As a well known rare earth based permanent magnet, for example, a Sm—Co based magnet material has been disclosed in Patent Document 1 and a Nd—Fe—B based magnet material has been disclosed in Patent Document 2. In term of the reserves, the price or the like of the raw materials of rare earths, the Nd—Fe—B based material is more widely used than the Sm—Co based material.

The Nd—Fe—B based magnet powder used in the bond magnet can be prepared by producing an amorphous or a submicron microcrystal via a liquid quenching method at first and providing a heat treatment followed by a pulverization process, as disclosed in Reference 2, wherein, the heat treatment mainly aims to control the structure of the amorphous or submicron crystal and the pulverization process provides micron to submicron crystals.

PATENT DOCUMENTS

Patent Document 1: JP-B-4276541
Patent Document 2:JP-A-60-9852

SUMMARY

However, in the conventional liquid quenching method, variability will be generated in the magnetic properties because variability is likely to be generated in the particle size of the crystal. On the other hand, as the Nd—Fe—B based material is easier to be oxidized than the Sm—Co based material, a problem exists that the residual magnetization or the maximum energy product is likely to deteriorate by pulverization.

The present invention is completed in view of the situation mentioned above. The present invention aims to provide a magnet powder in which the primary particle size of the crystal is uniformly micronized and the deterioration in magnetic properties due to pulverization is lessened. Also, the present invention aims to provide a high-performance bond magnet using the mentioned magnet powder.

In order to achieve the aims mentioned above, the magnet powder of the present invention is characterized in that the composition is composed of R (R consists of R1 and R2, R1 represents at least one rare earth element selected from the group consisting of Y, La, Ce, Pr, Nd, Sm, Eu, Tb, Dy, Er, Tm, Yb and Lu, and R2 represents at least one rare earth element selected from the group consisting of Ho and Gd), T (T represents at least one transition metal element containing Fe or the combination of Fe and Co as the necessary element(s)) and B, the atomic ratio of R2 to the sum of R1 and R2 (i.e., R2/(R1+R2)) is 0.05 to 0.1, the atomic ratio of R to T (i.e., R/T) is 0.25 to 0.35, and the average primary particle size is 45 to 100 nm.

The present inventors have found out that in the rare earth based permanent magnet powder having the R—Fe—B based main phase prepared via the liquid quenching method, the primary particle size of the R—Fe—B based main phase is uniformly micronized by containing a small amount of Ho or Gd and controlling the ratio in the R—Fe—B. As a result, a magnet powder having a high coercivity can be provided. The reason has not been confirmed yet. However, the present inventors consider that the crystallization energy for $R_2Fe_{14}B$ is increased by adding Ho or Gd to the R—Fe—B based amorphous alloy prepared via the liquid quenching method, and also it is hard to achieve the grain growth by providing a heat treatment. In addition, it has also been found out that the obtained magnet powder is hard to be oxidized and the deterioration of the magnetic properties caused by pulverization can be decreased when compared to the conventional R—Fe—B based powder.

Also, the present invention provides a bond magnet having the mentioned magnet powder. The bond magnet of the present invention is provided with a sufficiently high coercivity for containing the magnet powder with the characters mentioned above.

Further, the present invention provides a motor having the mentioned bond magnet. The motor of the present invention can be downsized and have high performance easily because it contains the bond magnet with the characters mentioned above.

According to the present invention, if a small amount of Ho or Gd is contained in the R—Fe—B based magnet powder and the ratio in the R—Fe—B is controlled, a magnet powder suitable for the bond magnet can be provided which has an approximately maintained residual magnetic flux density, a high coercivity and in which the deterioration of magnetic properties caused by pulverization can be decreased.

DETAILED DESCRIPTION OF EMBODIMENTS

Hereinafter, the present invention will be described in detail based on the embodiments. The present invention will not be limited to the following contents described in the embodiments and examples. Further, the elements in the following embodiments and examples includes contents within the equivalent scopes such as the contents that can be easily thought of by those skilled in the art, the contents that are substantively the same, and the like. In addition, the elements disclosed in the following embodiments and examples can be appropriately combined or properly selected in use.

The magnet powder of the present embodiment has a composition composed of R (R consists of R1 and R2, R1 represents at least one rare earth element selected from the group consisting of Y, La, Ce, Pr, Nd, Sm, Eu, Tb, Dy, Er, Tm, Yb and Lu, and R2 represents at least one rare earth element selected from the group consisting of Ho and Gd), T (T represents at least one transition metal element containing Fe or the combination of Fe and Co as the necessary element(s)) and B, wherein, the $R_2T_{14}B$ structure is the main phase.

In the present embodiment, the rare earth element R, contains R1 and R2. R1 is at least one selected from the group consisting of Y, La, Ce, Pr, Nd, Sm, Eu, Tb, Dy, Er, Tm, Yb and Lu. If it is considered to provide a high magnetic anisotropy field, R1 is preferred to be Nd, Pr, Dy, Ho and/or Tb. More preferably, R1 is Nd from the view point of the cost and the corrosion resistance of the starting material. R2 is at least one selected from the group consisting of Ho and Gd. If at least one of Ho and Gd is contained in the R-T-B based rapidly quenched magnet powder, the primary particle size of the main phase of $R_2T_{14}B$ in the powder can be micronized. R2 is preferred to be Ho in view of the micronization effect.

In the present embodiment, with respect to the composition of the magnet powder, the atomic ratio of R2 to the sum of R1 and R2 (i.e., R2/(R1+R2)) is 0.05 to 0.1. As the ratio occupied by R2 increases, the particle size of the main phase decreases. However, when the ratio of R2/(R1+R2) is larger than 0.1, the residual magnetic flux density will decrease as the replacement ratio of $Ho_2T_{14}B$ or $Gd_2T_{14}B$ having a low saturation magnetization increases in the main phase.

In the present embodiment, with respect to the composition of the magnet powder, the atomic ratio of R to T (i.e., R/T) is 0.25 to 0.35, and B accounts for the remnant. When the ratio of R/T is larger than 0.35, the ratio occupied by the minor phases will extremely increases, wherein the minor phases are richer in R than the main phases. In this case, the volume ratio of the main phases significantly decreases, and the residual magnetic flux density decreases. However, when the ratio of R/T is less than 0.25, as the ratio of R/T decreases, the minor phase grains decrease and the magnetization switching becomes easier, leading to a lowered coercivity. In addition, when the ratio of R/T is 0.1 or less which is extremely small, the ratio occupied by T extremely increases and a composition deviation is likely to occur during the processing of the rapidly quenched magnet powder. In this respect, variability of magnetic properties will be easily generated in the prepared magnet powder and the magnetic properties are likely to deteriorate.

In the present embodiment, T may contain 10 at % or less of Co. Co forms the same phase as Fe but is effective in elevating the Curie temperature and improving the corrosion resistance of the grain boundary phases. Further, the R-T-B based sintered magnet applicable in the present invention can contain either one of Al and Cu or both two in an amount of 0.01 to 1.2 at %. If either one of Al and Cu or both two is/are contained in such a range, the obtained sintered magnet will have a higher coercivity, a higher corrosion resistance and improved temperature properties.

In the present embodiment, part of B can be replaced with C. The amount of C to replace B is preferred to be 10 at % or less relative to B.

The magnet powder of the present embodiment is allowed to contain other element(s). For example, the elements such as Zr, Ti, Bi, Sn, Ga, Nb, Ta, Si, V, Ag, Ge and etc. can be properly contained. In addition, other components can also be contained as the impurities from the raw materials or the impurities mixed in during the preparation.

The magnet powder of the present embodiment has an average primary particle size of 45 to 100 nm. When the average primary particle size is smaller than 45 nm, the effect produced by the defect on the surface becomes more serious, and the magnetic properties deteriorate on the whole. When the average primary particle size is larger than 100 nm, the primary particle size increases while the magnetization switching mechanism turns to the nucleation related behavior and the coercivity decreases.

The amount of oxygen in the pulverized magnet powder of the present embodiment is 1000 ppm or less. If the amount of oxygen is high, the phases composed of rare earth oxides which are a non-magnetic component become more, thus the magnetic properties deteriorate.

Hereinafter, the preferable example of the preparation method in the present invention will be described.

At first, an ingot having a specified composition is prepared by an arc melting method or a high frequency induction melting method or the like. The melting process of the ingot is preferably performed under vacuum or at an inert atmosphere, and Ar atmosphere is more preferable.

Next, the ingot is prepared into small pieces. The small pieces are melted by a high frequency induction heating process, and then the molten metal is rapidly cooled via a single roll method. The rapid cooling method can be selected from the group consisting of the twin roll method, the splat quenching method, the rotating disk method or the gas atomization method. From the viewpoint of practicability, the single roll method is preferable. When the single roll method is used to rapidly cool the molten metal, the circumferential velocity of the cooling roller is preferred to be 20 to 40 m/s and is more preferably 30 to 40 m/s. If the circumferential velocity is fastened sufficiently, the rapidly cooled strip is likely to be amorphous. When the circumferential velocity is higher than 40 m/s, the rapidly cooled strip becomes extremely thin, and the magnet powder obtained after the heat treatment and the pulverization process has a worsened compressibility. In this respect, the bond magnet prepared by using the magnet powder will have a lowered density, and the maximum energy product $(BH)_{max}$ will decrease.

The rapidly cooled strip is subjected to a heat treatment in order to be crystallized. The heat treatment is performed for 1 to 30 minutes under vacuum or at an inert atmosphere at a temperature right above the crystallization point. It is because that if such a treatment is performed for more than 30 minutes, then the grain growth or the formation of heterogeneous phases will continue and a bad influence will be brought to the magnetic properties. The heating and cooling rates are preferably 10° C./min to 700° C./min and are more preferably 400° C./min to 700° C./min. If the treatment is performed with heating and cooling rates lower than 10° C./min, heterogeneous phases will be easily formed.

After the heat treatment, the crystallized rapidly cooled strip is subjected to a coarse pulverization process. In the pulverization process, a stamp mill, a jaw crusher or the like can be used. The pulverized particle size can be 50 μm or more and 300 μm or less. Thus, a rapidly cooled magnet powder can be obtained which can be suitably used as the magnet powder for a bond magnet.

Hereinafter, the preparation method for the bond magnet of the present embodiment will be described. A resin binder containing a resin is mixed with the rapidly cooled magnet powder by using a pressurized mixer such as a pressurized kneader so as to provide a compound for the bond magnet. The resin can be a thermosetting resin such as the epoxy resin, the phenolic resin and the like; or a thermoplastic resin such as a styrene-based elastomer, olefin-based elastomer, urethane-based elastomer, polyester-based elastomer, polyamide-based elastomer, ionomer, ethylene-propylene copolymers (EPM), ethylene-ethyl acrylate copolymers, polyphenylene sulfide (PPS) and the like. Of these, the resin used in compression molding is preferably a thermosetting resin and is more preferably the epoxy resin or the phenolic resin. On the other hand, the resin used in the injection molding is preferably a thermoplastic resin. Further, if required, a coupling agent or other additives can be added in the compound for the rare earth based bond magnet.

In addition, with respect to the content ratios of the magnet powder and the resin in the bond magnet, it is preferred that 0.5 mass % or more and 20 mass % or less of resin is contained relative to 100 mass % of the magnet powder. If the content of resin is less than 0.5 mass % relative to 100 mass % of the rare earth based alloy powder, the shape-keeping property tends to be deteriorated. If the resin accounts for more than 20 mass %, the magnetic properties are tend to be hard to be sufficiently obtained.

After the compound for the bond magnet mentioned above is prepared, a bond magnet containing both the rapidly cooled magnet powder and the resin can be obtained by subjecting the compound for the bond magnet to an injection molding process. When the bond magnet is prepared by an injection molding process, the compound for the bond magnet is heated to the melting temperature of the binder (the thermoplastic resin) according to the needs. Then, the compound for the bond magnet in a flow state is injected into a mold with a specified shape so as to perform the molding process. After cooled down, the molded article with a specified shape is taken out from the mold. In this way, a bond magnet has been prepared. The preparation method for the bond magnet is not limited to the method by injection molding mentioned above. For example, the compound for the bond magnet can also be subjected to a compression molding process so as to provide a bond magnet containing the rapidly cooled magnet powder and the resin. When the bond magnet is prepared via the compression molding process, after prepared, the compound for the bond magnet is filled into a mold with a specified shape. After application of a pressure, a molded article having a specified shape is taken out from the mold. When the pressure is applied to the compound for the bond magnet filled in the mold, the compression molding process is performed by a compression molding machine such as a mechanical press or oil-pressure press and the like. Thereafter, the molded article is placed in a furnace such as a heating furnace or a vacuum drying oven, and then the resin is cured by applying heat. In this way, a bond magnet is obtained.

EXAMPLES

Hereinafter, the present invention will be described in detail by Examples and Comparative Examples. However, the present invention is not limited to the following examples.

Comparative Example 1

The composition of the starting material was 18 at % of R-72 at % of Fe-10 at % of B, wherein Nd was used as R. Nd, Fe and FeB with a purity of 99.9% were prepared to provide the mentioned composition. The ingot was prepared by an arc melting method at Ar atmosphere which was then made into small pieces. The small pieces were subjected to a high frequency induction melting method and then rapidly cooled via a single roll method with the circumferential velocity being 40 m/s. In this way, a rapidly cooled strip was provided. The halo pattern of the rapidly cooled strip was confirmed to be amorphous in an X-ray diffractometer. The rapidly cooled strip was heated with a heating rate 700° C./min. Then, a heat treatment was performed for 1 minute at 650° C. followed by a rapidly cooling process. The back-scattered electron image of the section of the rapidly cooled strip after the heat treatment was observed by using a FE-SEM (held emission scanning electron microscope). The equivalent circle diameter of the area was calculated for 100 main phase grains in the observation image via an image analysis method, and the obtained average was used as the average primary particle size. In addition, the variability Ra was obtained by the following equation that Ra=the maximum particle diameter of the observed grains−the minimum particle diameter of the observed grains. The rapidly cooled strip obtained after the heat treatment was pulverized by a stamp mill so that a magnet powder having an average particle size of 51 μm was obtained. The oxygen content of the obtained magnet powder was measured by a combustion-infrared absorption method.

Further, the magnetization-magnetic field curve was measured by using a vibrating sample magnetometer (VSM), and the coercivity HcJ and the residual magnetic flux density Br of the obtained magnet powder were calculated accordingly. The result was shown in Table 1.

Comparative Example 2

A rapidly cooled strip was prepared as in Comparative Example 1 except that R in the composition of the starting material was set in such a manner that R1=Nd and R2=Ho and the atomic ratio of R2/(R1+R2) was 0.02. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 1

A rapidly cooled strip was prepared as in Comparative Example 1 except that R in the composition of the starting material was set in such a manner that R1=Nd and R2=Ho and the atomic ratio of R2/(R1+R2) was 0.05. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 2

A rapidly cooled strip was prepared as in Comparative Example 1 except that R in the composition of the starting material was set in such a manner that R1=Nd and R2=Ho and the atomic ratio of R2/(R1+R2) was 0.1. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 3

A rapidly cooled strip was prepared as in Comparative Example 1 except that R in the composition of the starting material was set in such a manner that R1=Nd and R2=Ho and the atomic ratio of R2/(R1+R2) was 0.13. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 4

A rapidly cooled strip was prepared as in Comparative Example 1 except that R in the composition of the starting material was set in such a manner that R1=Nd and R2=Ho and the atomic ratio of R2/(R1+R2) was 0.15. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 5

A rapidly cooled strip was prepared as in Comparative Example 1 except that R in the composition of the starting material was set in such a manner that R1=Nd and R2=Ho and the atomic ratio of R2/(R1+R2) was 0.2. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 6

A rapidly cooled strip was prepared as in Comparative Example 1 except that R in the composition of the starting material was set in such a manner that R1=Nd and R2=Ho and the atomic ratio of R2/(R1+R2) was 0.5. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 7

A rapidly cooled strip was prepared as in Comparative Example 1 except that R in the composition of the starting material was set to be Ho. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 8

A rapidly cooled strip was prepared as in Example 1 except that the composition of the starting material was set to be 12 at % of R-80 at % of Fe-8 at % of B. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 9

A rapidly cooled strip was prepared as in Example 1 except that the composition of the starting material was set to be 15 at % of R-75 at % Fe-10 at % of B. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 3

A rapidly cooled strip was prepared as in Example 1 except that the composition of the starting material was set to be 21 at % of R-69 at % of Fe-10 at % of B. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 4

A rapidly cooled strip was prepared as in Example 1 except that the composition of the starting material was set to be 23 at % of R-65 at % of Fe-12 at % of B. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 10

A rapidly cooled strip was prepared as in Example 1 except that the composition of the starting material was set to be 25 at % of R-62 at % of Fe-13 at % of B. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 11

A rapidly cooled strip was prepared as in Comparative Example 2 except that R in the composition of the starting material was set in such a manner that R2=Gd. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 5

A rapidly cooled strip was prepared as in Example 1 except that R in the composition of the starting material was set in such a manner that R2=Gd. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 6

A rapidly cooled strip was prepared as in Example 2 except that R in the composition of the starting material was set in such a manner that R2=Gd. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 12

A rapidly cooled strip was prepared as in Comparative Example 3 except that R in the composition of the starting material was set in such a manner that R2=Gd. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 13

A rapidly cooled strip was prepared as in Comparative Example 4 except that R in the composition of the starting material was set in such a manner that R2=Gd. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 14

A rapidly cooled strip was prepared as in Comparative Example 5 except that R in the composition of the starting material was set in such a manner that R2=Gd. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 15

A rapidly cooled strip was prepared as in Comparative Example 1 except that R in the composition of the starting material was set in such a manner that R1=Nd and R2=Pr and the atomic ratio of R2/(R2+R2) was 0.3. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Example 7

A rapidly cooled strip was prepared as in Comparative Example 1 except that R in the composition of the starting material was set in such a manner that R1=Nd or Pr and R2=Ho, the atomic ratio of Pr/(R1+R2) was 0.2 and the atomic ratio of R2/(R1+R2) was 0.1. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

Comparative Example 16

A rapidly cooled strip was prepared as in Comparative Example 1 except that R in the composition of the starting material was set in such a manner that R1=Nd and R2=Y and the atomic ratio of R2/(R1+R2) was 0.3. Then, as in Comparative Example 1, the average primary particle size and the variability Ra were calculated from FE-SEM derived result. After the rapidly cooled strip was pulverized, as in Comparative Example 1, oxygen content was measured and then HcJ and Br were obtained from the measuring result of VSM. The result was shown in Table 1.

Example 8

A rapidly cooled strip was prepared as in Comparative Example 1 except that R in the composition of the starting material was set in such a manner that R1=Nd or Y and R2=Ho, the atomic ratio of Y/(R1+R2) was 0.2 and the atomic ratio of R2/(R1+R2) was 0.1. Then, as in Comparative Example 1, the average primary particle size and the variability Ra were calculated from FE-SEM derived result. After the rapidly cooled strip was pulverized, as in Comparative Example 1, the oxygen content was measured and then HcJ and Br were obtained from the measuring result of VSM. The result was shown in Table 1.

As shown in Table 1, it can be seen from the comparison between Examples 1 to 2 and Comparative Examples 1 to 7 all of which had the same ratio of R/Fe that the average primary particle size and its variability decreased as the substitution amount of Ho increased. Also, the content of oxygen was reduced after pulverization. As a result, the coercivity became larger. However, if the atomic ratio of R2/(R1+R2) was larger than 0.1, Br evidently decreased compared to the case where no Ho was contained.

In addition, if Examples 1, 3 and 4 were compared with Comparative Examples 8 to 10, it can be known that sufficient magnetic properties would be obtained when the ratio of R/Fe was 0.25 to 0.35 but HcJ would decrease greatly when such a ratio was lower than 0.25. This might be due to the decrease of the minor phase grains and the magnetization switching easily to be performed. However, when the ratio was larger than 0.35, Br was evidently decreased. The extremely increased ratio of the minor phase grains (winch is richer in R than the main phase grains) and the significant decrease in the volume ratio of the main phases were considered to be the causes.

Further, if Examples 5 and 6 and Comparative Examples 11 to 15 were observed, it can be confirmed that the same effect would be provided as Ho when Gd was used to perform the replacement.

Then, if Examples 2, 7 and 8 and Comparative Examples 1, 15 and 16 were observed, it can be confirmed that Ho produced the same effect even if the rare earth element(s) other than Nd was contained in R1.

TABLE 1

| | Composition | R/Fe | Average particle size (nm) | Ra (nm) | Content of oxygen after pulverization (ppm) | RcJ (kOc) | Br (kG) |
|---|---|---|---|---|---|---|---|
| Comparative Example 1 | Nd18Fe72B10 | 0.25 | 190 | 115 | 1210 | 21.9 | 8.6 |
| Comparative Example 2 | (Nd0.98Ho0.02)18Fe72B10 | 0.25 | 143 | 94 | 1030 | 22.0 | 8.6 |
| Example 1 | (Nd0.95Ho0.05)18Fe72B10 | 0.25 | 98 | 79 | 720 | 22.5 | 8.4 |
| Example 2 | (Nd0.9Ho0.1)18Fe72B10 | 0.25 | 52 | 34 | 480 | 23.1 | 8.1 |
| Comparative Example 3 | (Nd0.87Ho0.13)18Fe72B10 | 0.25 | 44 | 30 | 480 | 23.5 | 7.6 |
| Comparative Example 4 | (Nd0.85Ho0.15)18Fe72B10 | 0.25 | 43 | 21 | 470 | 23.7 | 7.5 |
| Comparative Example 5 | (Nd0.8Ho0.2)18Fe72B10 | 0.25 | 40 | 15 | 390 | 24.4 | 7.2 |
| Comparative Example 6 | (Nd0.5Ho0.5)18Fe72B10 | 0.25 | 33 | 8 | 350 | 26.4 | 5.5 |
| Comparative Example 7 | Ho18Fe72B10 | 0.25 | 31 | 9 | 130 | 5.6 | 1.8 |
| Comparative Example 8 | (Nd0.95Ho0.05)12Fe80B8 | 0.15 | 122 | 86 | 790 | 14.1 | 8.4 |
| Comparative Example 9 | (Nd0.95Ho0.05)15Fe75B10 | 0.20 | 109 | 85 | 760 | 19.6 | 8.2 |
| Example 3 | (Nd0.95Ho0.05)21Fe69B10 | 0.30 | 97 | 75 | 690 | 22.9 | 8.1 |
| Example 4 | (Nd0.95Ho0.05)23Fe65B12 | 0.35 | 92 | 77 | 670 | 23.3 | 8.0 |
| Comparative Example 10 | (Nd0.95Ho0.05)25Fe62B13 | 0.40 | 84 | 63 | 580 | 24.9 | 7.1 |
| Comparative Example 11 | (Nd0.98Gd0.02)18Fe72B10 | 0.25 | 149 | 101 | 1070 | 22.0 | 8.4 |
| Example 5 | (Nd0.95Gd0.05)18Fe72B10 | 0.25 | 99 | 82 | 810 | 22.2 | 8.4 |
| Example 6 | (Nd0.9Gd0.1)18Fe72B10 | 0.25 | 66 | 45 | 570 | 22.7 | 8.2 |
| Comparative Example 12 | (Nd0.87Gd0.13)18Fe72B10 | 0.25 | 55 | 40 | 570 | 21.7 | 7.7 |
| Comparative Example 13 | (Nd0.85Gd0.15)18Fe72B10 | 0.25 | 54 | 32 | 550 | 21.6 | 7.7 |
| Comparative Example 14 | (Nd0.8Gd0.2)18Fe72B10 | 0.25 | 42 | 25 | 420 | 18.3 | 7.4 |
| Comparative Example 15 | (Nd0.7Pr0.3)18Fe72B10 | 0.25 | 211 | 182 | 1230 | 22.7 | 8.6 |
| Example 7 | (Nd0.7Pr0.2Ho0.1)18Fe72B10 | 0.25 | 88 | 61 | 690 | 24.2 | 8.0 |
| Comparative Example 16 | (Nd0.7Y0.3)18Fe72B10 | 0.25 | 150 | 94 | 1460 | 18.9 | 9.3 |
| Example 8 | (Nd0.7Y0.2Ho0.1)18Fe72B10 | 0.25 | 48 | 28 | 970 | 21.5 | 8.9 |

What is claimed is:

1. A magnet powder consisting of R, T and B, wherein, R consists of R1 and R2, R1 represents at least one rare earth element selected from the group consisting of Y, La, Ce, Pr, Nd, Sm, Eu, Tb, Dy, Er, Tm, Yb and Lu, R2 represents at least one rare earth element selected from the group consisting of Ho and Gd, T represents at least one transition metal element containing Fe or a combination of Fe and Co, the atomic ratio of R2 to the sum of R1 and R2 is 0.05 to 0.1, the atomic ratio of R to T is 0.25 to 0.35, and the powder has an average primary particle size of 4 to 100 nm.

2. A bond magnet in which the magnet powder of claim 1 is used.

3. A motor in which the magnet of claim 2 is used.

* * * * *